(12) United States Patent
Suzuki

(10) Patent No.: US 6,520,429 B1
(45) Date of Patent: Feb. 18, 2003

(54) MULTI-TUBE EXTRUDING EQUIPMENT

(76) Inventor: Hideo Suzuki, 387-1 Nihongi Mizuho machi, Nishitamagun Tokyo (JP), 190-1201

( * ) Notice: Subject to any disclaimer, the term of this patent is extended or adjusted under 35 U.S.C. 154(b) by 0 days.

(21) Appl. No.: 09/478,794

(22) Filed: Jan. 7, 2000

(51) Int. Cl.[7] .............................. B05B 1/14; B05B 1/20
(52) U.S. Cl. ....................... 239/548; 239/553; 239/556; 239/566; 239/568
(58) Field of Search .................... 239/548, 553, 239/556, 566, 568; 264/167, 173.17, 177.16, 209.2, 169; 425/376.1, 382.3, 382 N, 464

(56) References Cited

U.S. PATENT DOCUMENTS

| | | | | |
|---|---|---|---|---|
| 4,687,433 A | * | 8/1987 | Ozaki et al. | 425/464 |
| 4,883,420 A | * | 11/1989 | Ozaki et al. | 425/464 |
| 4,954,061 A | * | 9/1990 | Repholz et al. | 425/131.1 |
| 4,975,055 A | * | 12/1990 | LaPlante | 433/82 |
| 5,589,122 A | * | 12/1996 | Leonard et al. | 264/146 |
| 5,614,276 A | * | 3/1997 | Petsetakis | 425/36.9 |

OTHER PUBLICATIONS

Daredemowakaru Laminating, pp. 100,101, Oct. 6, 1998, Matsumoto, Hirokazu.
Daredemowakaru Laminating, pp. 90–92, Oct. 6, 1998, Matsumoto Hirokazu.
"Daredemowakaru Laminating" pp. 66–71, Oct. 6, 1998, Matsumoto Hirokazu.
"Konbatheku" pp. 29–32, Dec. 1996, Nakamura Takeshi.
"Konbatheku" pp. 20–25, Nov. 1995, Fukano Katsunori.
"Konbatheku" pp. 14–19, Dec. 1996, Gary D. Oliver.
"Konbatheku" pp. 28–32, Oct. 1998, Tsuda shingo.
"Konbatheku" pp. 33–36, Oct. 1998, Takehara Hidemaro.

* cited by examiner

*Primary Examiner*—Henry C. Yuen
*Assistant Examiner*—Davis Hwu
(74) *Attorney, Agent, or Firm*—Young & Thompson

(57) ABSTRACT

To supply a Multi-tube extruding equipment that is capable of producing uniform film of thickness variation that is minimized to almost "zero" level.

This equipment 1 comprises
- Joint 2 that connects this equipment and the fluid coating material supply equipment by hoses etc.
- A bunch of tubes 3 of which one ends 3a at the inlet of the fluid coating material are fastened to the Joint 2 and the other ends 3b at the outlet of the material are lined up in a single plane and connected to the die lips 5 in the cross machine direction
- Slit 5a which converts the fluid material flown in from the inlet 3a and flown out from the outlet 3b of the tubes into a film of a pre-determined thickness, and extrudes out the film of the width A through the die lips 5.

14 Claims, 19 Drawing Sheets

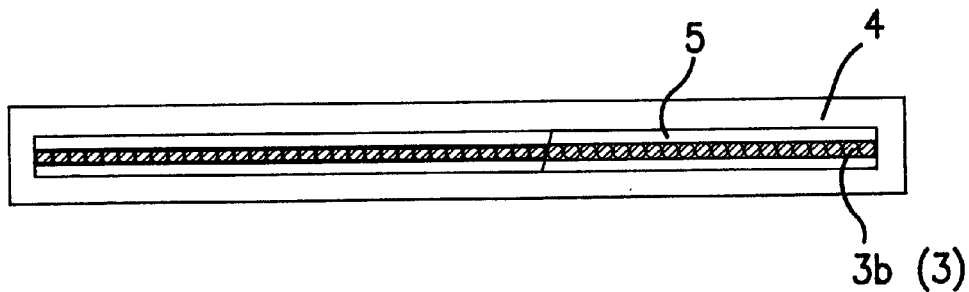
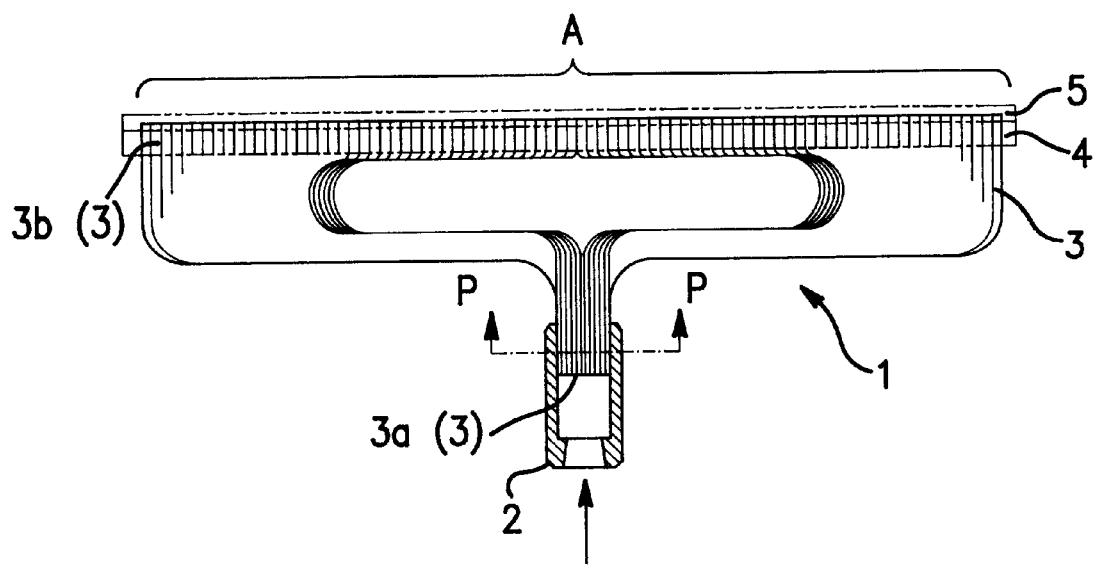

A B A B A B

A B A B A B A

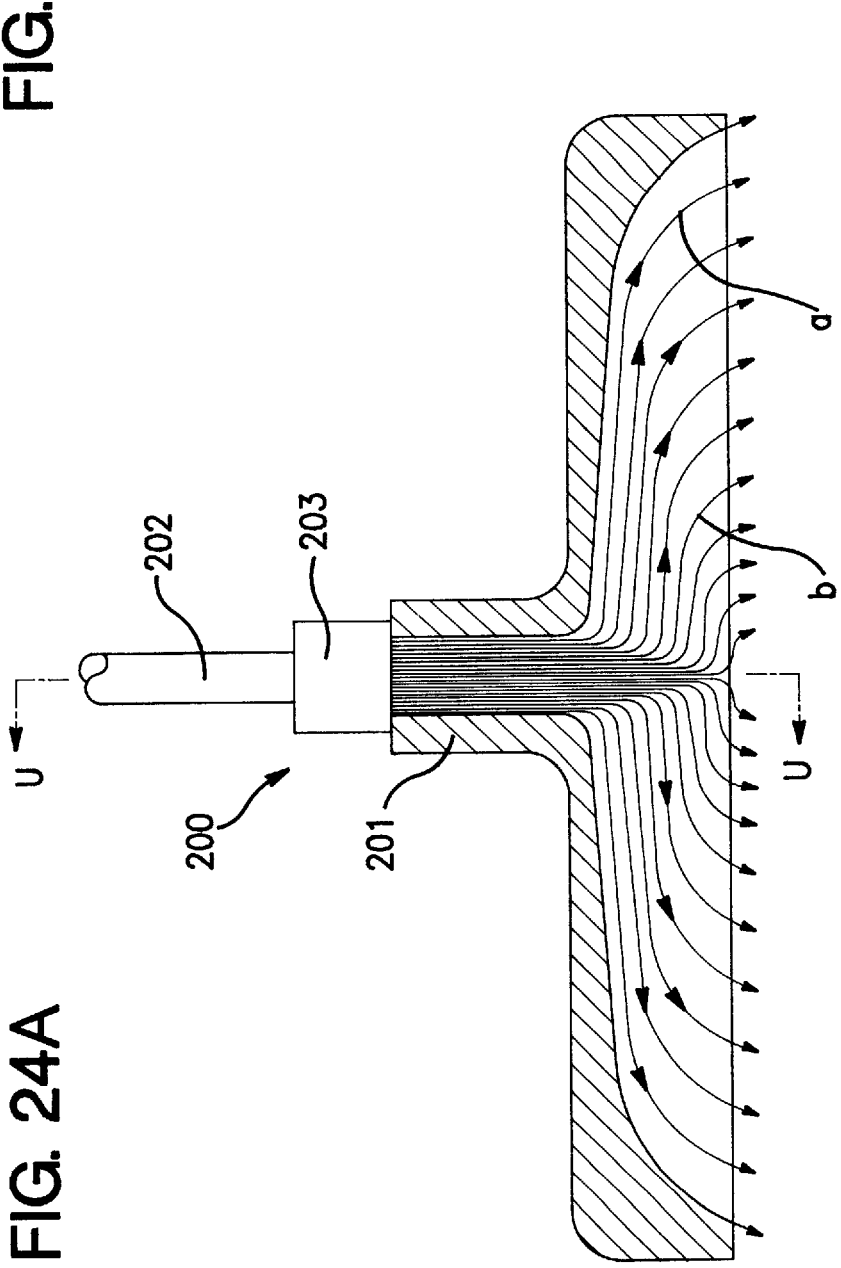
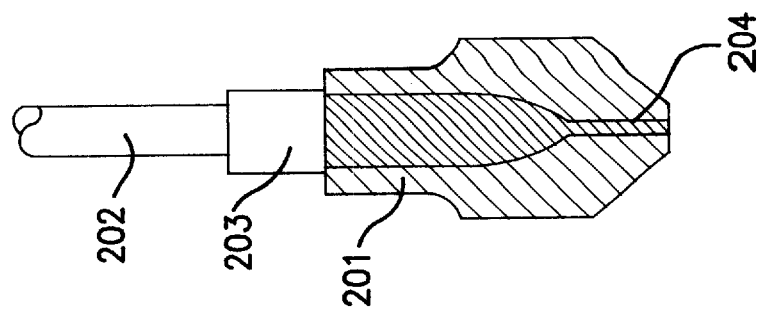
FIG. 24A
FIG. 24B

MULTI-TUBE EXTRUDING EQUIPMENT

BACKGROUND OF THE INVENTION

This invention concerns an extruding equipment with multi-tubes which can be used for extrusion of fluid plastic materials to make various formed products or for coating of fluid chemicals onto the web surface.

The typical conventional extrusion dies used for making plastic films among many types are as follows:

Coat hanger type (normally called as "T-Die") which is explained in details hereinafter Manifold type of which die is equipped with holding chambers (called as "Manifold")

Same as above Manifold type but with a built-in agitating roll inside each manifold. This agitating roll prevents deterioration of the fluid materials.

Hereinafter, the outline of the T-Die of Coat hanger type is described with reference to Drawing 24. The illustration (A) in the drawing shows the section when viewing from the front and (B) shows the U—U section of the illustration (A). This extrusion die 200 has such a T-shape construction die 201 as shown in the illustration (A). The plastic material melted by the heater in the preceding fluid supply equipment (not shown) is sent to the die via the pipe 202 and coupling 203 by a gear-pump or an extruder (not shown). As shown in the illustration (A), the fluid plastic material flows and spreads from the center of the die 201 in the cross machine direction along the internal wall, then goes through the slit 204 to the slice lips where the material is extruded out into a film of a pre-determined width.

On the other hand, a so called "co-extrusion" product is sometime produced by this Coat hanger type extrusion die. The "co-extrusion" is such a process where more than two different plastic materials are extruded from the die to form, by lamination, certain layers of a multi-layer product. The extrusion die for production of this kind of product is basically similar to 201 die. What is different is the so-called "feed blocks" mounted just before the extrusion die 201. At this "feed blocks", some pre-adjustment of the melted plastic material can be made before going to the extrusion die, for purpose of getting a more uniform thickness for each layer of the product. Of course, it is very important to keep a stable uniform flow of stock for all of the layers.

Basic problems in the flow of raw materials before or inside the extrusion die have not yet been solved while various improvements of the die itself for extrusion of one or more different plastic materials have been made. It is hard to produce uniform extruded products by such an extrusion die as shown in Drawing 24 because the amount of raw material extruded from the outlet of the die per hour in the cross machine direction could vary from location to location due to the difference in the velocity of raw materials flow inside the die, for example, the velocity in the flow line "a" and that of the flow line "b" are different. Another problem is some deterioration of quality of the products caused by the shearing force to the fluid raw materials and different retention time of the raw materials in the die due to the difference in the velocity among the locations. In addition, the relatively large internal volume of such die requires a bigger volume and more time in refilling of the raw materials at each strat-up time, which results in a bigger loss of such raw material. More time and detergent for washing is required, too, because of the large internal volume.

As the die of this design has such a slit portion as shown in (B) of Drawing 24, some deformation of the slit portion takes place by so called "Clam-shell phenomenons (the die lips being opened)". Such deformation is variable from time to time by the change in the fluid viscosity and the fluid volume extruded. A sophisticated automatic control system to adjust the lips opening is available for installation so that a balanced flow of the fluid raw material in the die could be secured for producing an uniform layer. However, the high cost of such a control system is another problem. On top of the above mentioned problems, this die has another problem, that is, the change of the coating width takes time and is not so easily done.

As for the co-extrusion type, unsolved problems due to multi-layers structure still remain even though a lot of improvements of the die itself have been made by many people. The major reasons for this problem are the unstable flow of the fluid raw materials among layers and the cross machine direction profile of thickness of each layer could be easily deteriorated. The cause for unstable flows among layers is the large influence of the shearing force at the contacting surface between two layers which is called as "Welded line" where the lamination of the two layers is very poor because of less dispersion of high molecule chains. The instability among layers results in the uneven wave and reduces the value of the product. The cross machine direction thickness profile of each layer easily gets uneven and causes a so-called "wrapping phenomenon", that is, the higher viscosity fluid is wrapped by the lower viscosity fluid. Such a technology to make a pre-adjustment of melted plastic materials in order to avoid the above mentioned "wrapping phenomenon" has been developed but it is not enough to completely stop the wrapping phenomenon. The method of the pre-adjustment must be also developed for each specific features of the phenomenon respectively and is not practical for use in the industry.

OBJECTS AND SUMMARY OF THE INVENTION

The first object of the invention is to make an extruding equipment available to the industry of which manufacturing cost is low and capable to reduce the raw material and time required for the initial filling at the time of start-up and to reduce the loss of the raw material, too. The second object of the invention is to make an extruding equipment available to the industry which is capable to produce products of uniform and good quality. The third object of the invention is to make an extruding equipment available to the industry which is capable to produce the film with almost nil variation of thickness in the cross machine direction. The fourth object of the invention is to make an extruding equipment available to the machinery manufacturers which allows more tolerance for machining and requires less skill in manufacturing.

In order to achieve the above mentioned objects, this Multi-tube extruding equipment of which patent is claimed under the first claim hereinafter comprises a joint to connect the bunched tubes and the material supply equipment by a hose etc.

multi-tubes of which one ends at the material inlet side are bunched and securely inserted into the joint, and the other ends at the material outlet side are lined up in a plane in the cross machine direction.

The secure fastening of the other ends of the lined up tubes in a plane means not only the fastening of the ends of the whole tubes lined up in a plane and in the cross machine direction to the extrusion die but also the fastening of the ends of each divisional bunch of tubes also lined up in a plane and in the cross machine direction, bunch by bunch, to the extrusion die. The unfastened ends of the tubes could be used in some applications.

The advantages of an extruding or coating equipment having such components as mentioned hereinabove are as follows:

1) the manufacturing cost is cheaper than that of conventional equipment which is fabricated from the casted or forged metal block and finished by fine machining
2) less amount of the material & time for the initial filling and a minimized loss of the material at the time of start-up due to its smaller internal volume (total of the internal volume of the tubes) than such conventional extruding die as 101 of Drawing 24
3) less consumption of the detergent and time for washing of the equipment due to the same reason as that of above 2)
4) quicker work in case of a change of the product.

As the above mentioned tubes are used on this equipment it is possible to have the direction of the material inflow and the direction of the outflow at right angles to each other. In other words, both ends of the tubes—one ends on the material inlet side and the other ends on the material outlet side—could be installed at right angles to each other. This kind of arrangement is impossible on the conventional extruding equipment or coating equipment. The installation angles of the direction of the material inflow and that of the material outflow could be not only the right angles but also any other angles.

This Multi-tube extruding equipment is capable to handle such various materials as hot melt plastic material, for example, high-molecule chemical compound melted metal fluid coating material, paint etc.

solid materials like powder, granule gaseous materials.

As for the raw material distribution tubes, the material, the shape (especially, square or round section), the diameter & length, and the quantity of tubes are variable depending upon the extruding material or coating material and also the application. A careful design and engineering should select such parameters, especially the quantity after due consideration to the hydraulic pressure of the fluid material flowing inside the tube and the width of extruding or coating.

This Multi-tube extruding equipment under the second claim hereinafter with a certain number of material distribution tubes of an identical length enables an uniform delivery of the material from each tube as the supply amount per hour from every tube is maintained same. In other words, the variation of the supply volume of the material in the cross machine direction is regarded "nil". The constant and uniform material flow in each tube also makes possible to have an excellent supply of the material for an excellent extrusion. On the contrary, the different retention time of the raw material in the die of the conventional extruding equipment causes some deterioration of the quality of the finished product.

This Multi-tube extruding equipment under the third & fourth claims hereinafter with the coating die is ideal for film coating of chemicals or paints on the surface of the base material. The equipment under the third claim hereinafter has the die lips where the other ends of the tubes are securely fastened to and also has the slit to convert the raw material into the film of a pre-determined thickness before extruding out through the die lips. The film thickness can be adjustable within the range from 0.01 $\mu$m to a few mm and the thickness variation across the machine direction can be maintained to the level of "nearly zero".

The equipment under the fourth claim hereinafter has a flow rectifying attachment inside the slit on the outlet side of the tubes. This arrangement enables to make the slit larger and the fabrication work easier because a bigger machining tolerance is allowed (for example, the tolerance of the slit at 0.3 mm±3$\mu$ per 1 meter width can be replaced by a more generous tolerance of 3 mm±30$\mu$). The larger slit also enables this equipment to handle fluid materials of higher viscosity. The equipment under the third and fourth claims hereinafter, of course, can be used for extrusion-lamination, too.

The following effects are brought by the invention of the Multi-tube extruding equipment:

Very low manufacturing cost of the equipment

Almost no time and no raw materials required for the initial filling of the equipment at the time of start-up Minimized loss of the raw materials Stable production of goods of high and uniform quality Nearly zero variation of thickness across the machine direction Larger tolerances for machining and less professional machining skill

BRIEF DESCRIPTION OF THE DRAWINGS

FIG. 1 This is the illustration to show the Multi-tube extruding equipment, claimed under this application, for use as the coating die.

FIG. 24 This shows the outline of the conventional coat-hanger type coating die.

DETAILED DESCRIPTION OF THE PREFERRED EMBODIMENT

Figure 2A:
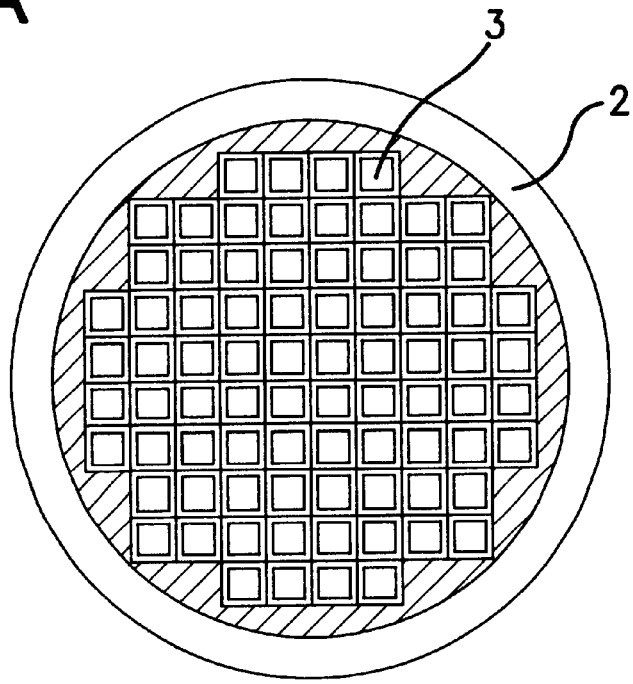
FIG. 2 This shows the P—P section of Drawing 1.
Figure 2B:
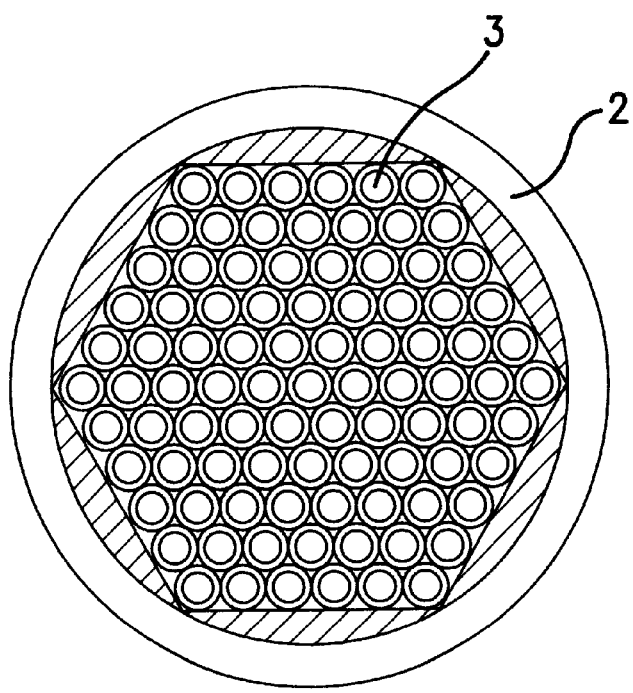
Figure 3A:
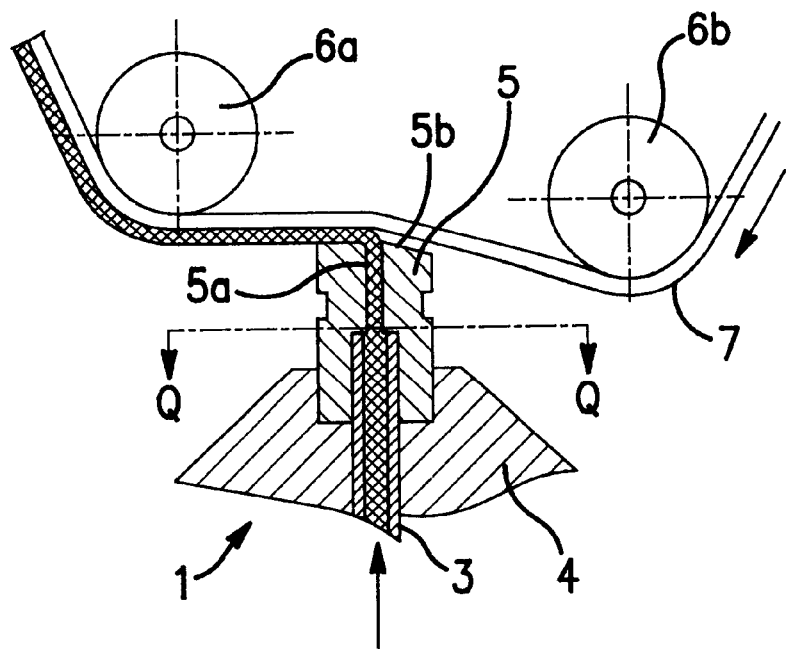
FIG. 3 This shows the application of the equipment of Drawing 1 for coating purpose.
Figure 3B:
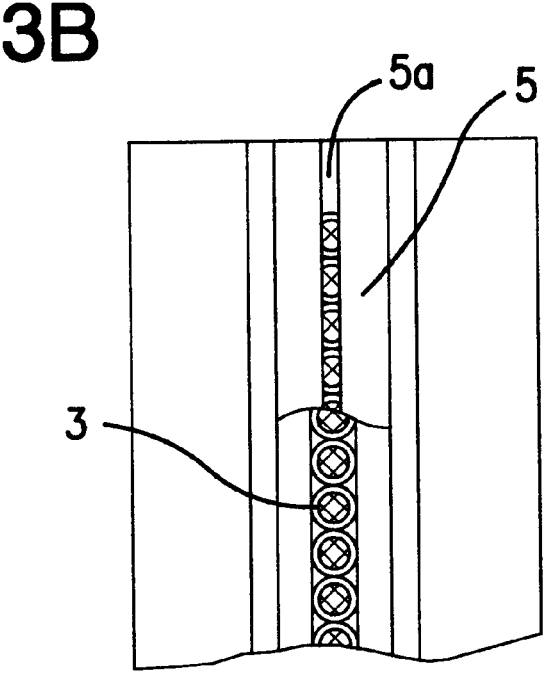
Figure 4:
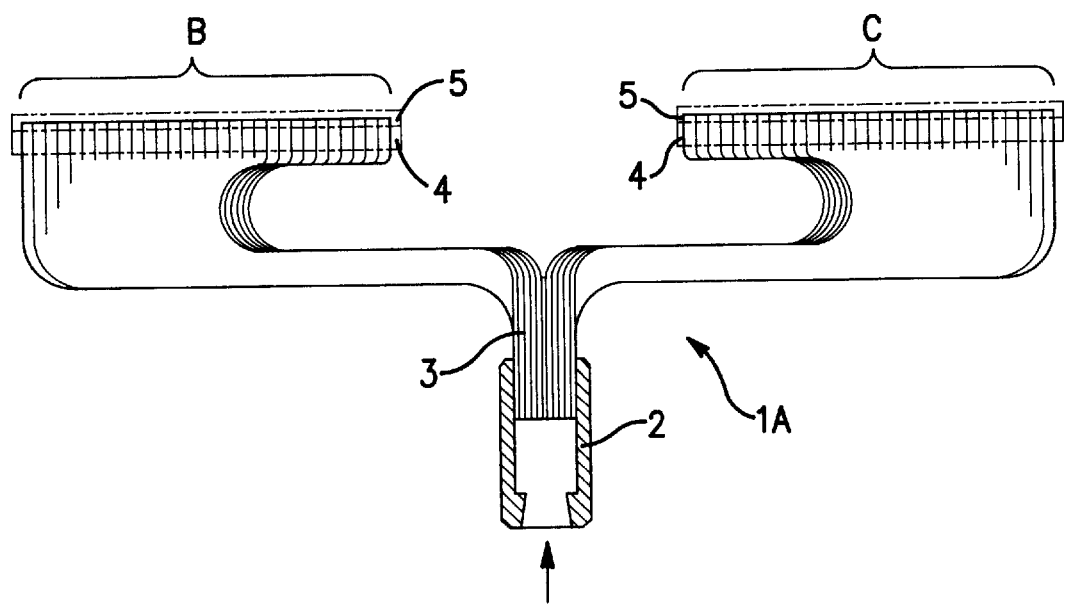
FIG. 4 This is the illustration to show one of the Multi-tube extruding equipment of which design is different from that of Drawing 1.
Figure 5:
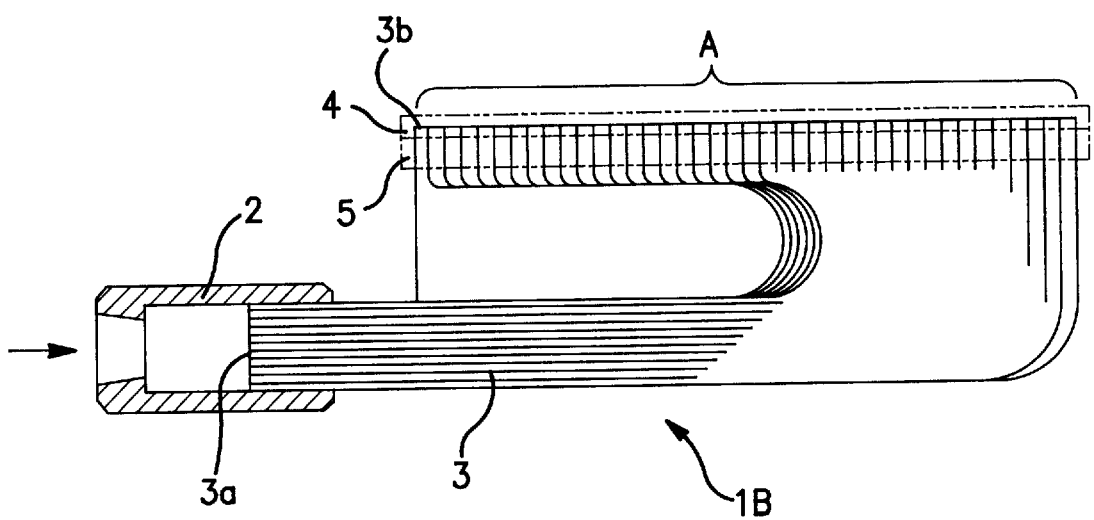
FIG. 5 This is also the illustration to show another one of the Multi-tube extruding equipment of which design is different from that of Drawing 1.
Figure 6A:
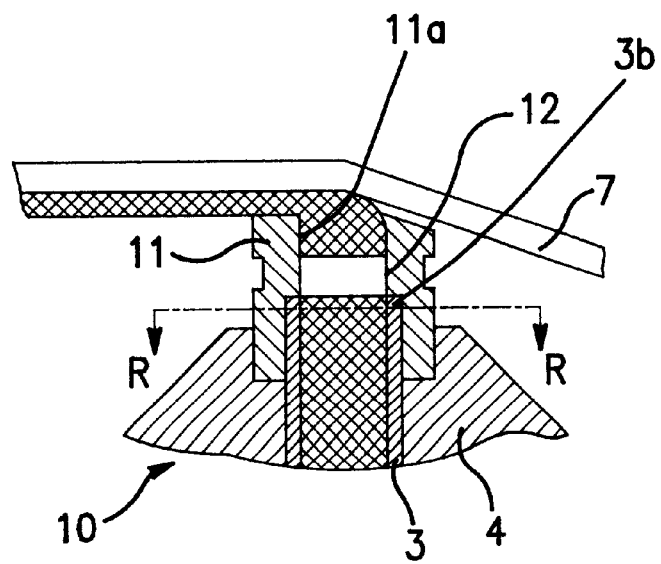
FIG. 6 This is the illustration of a coating process with a different coating head from that of Drawing 1.
Figure 6B:
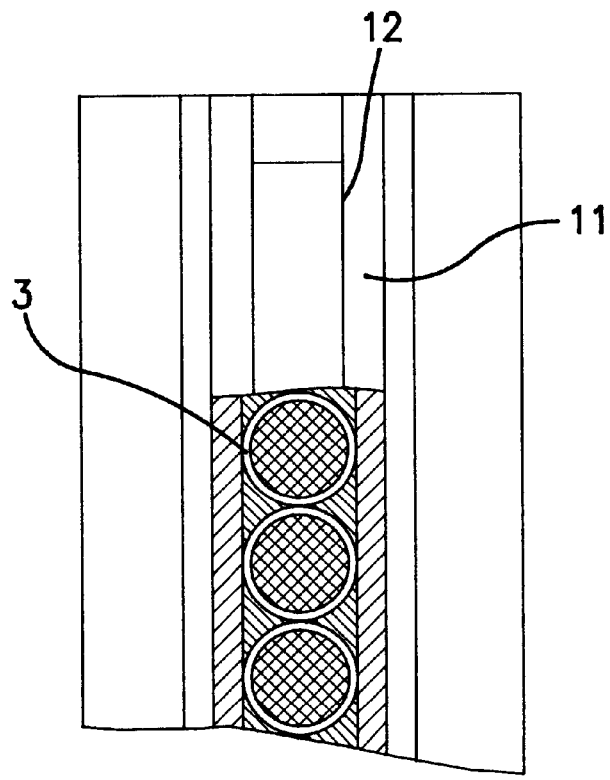
Figure 7A:
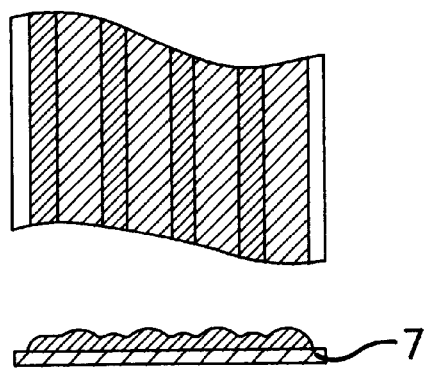
FIG. 7 This shows some samples of the product surface coated by the equipment of Drawings 1 or 6.
Figure 7B:
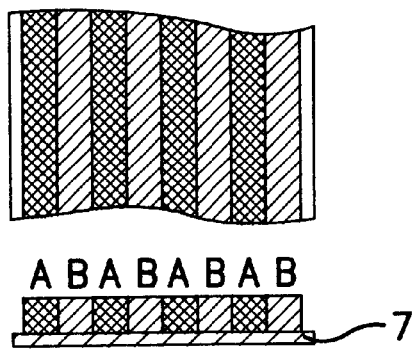
Figure 7C:
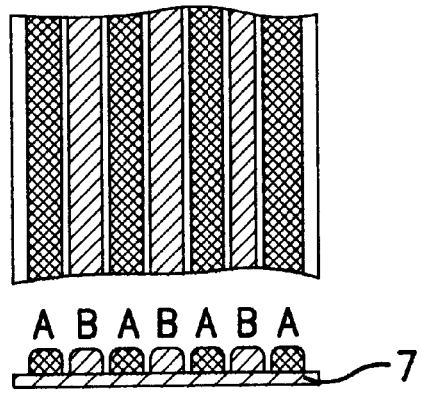
Figure 8A:
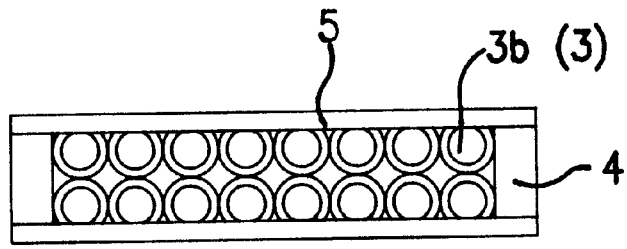
FIG. 8 This illustrates the layout of tubes for multi-layer coating purpose.
Figure 8B:
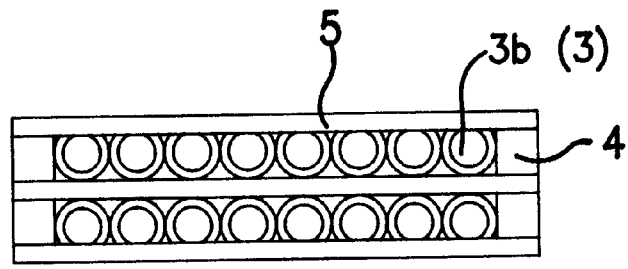
Figure 9A:
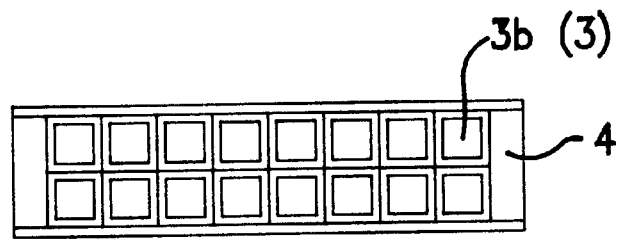
FIG. 9 This also illustrates the layout of tubes for multi-layer coating purpose.
Figure 9B:
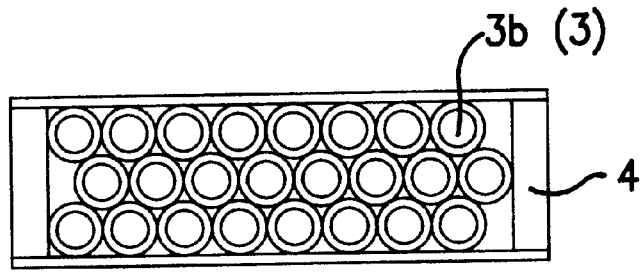
Figure 10:
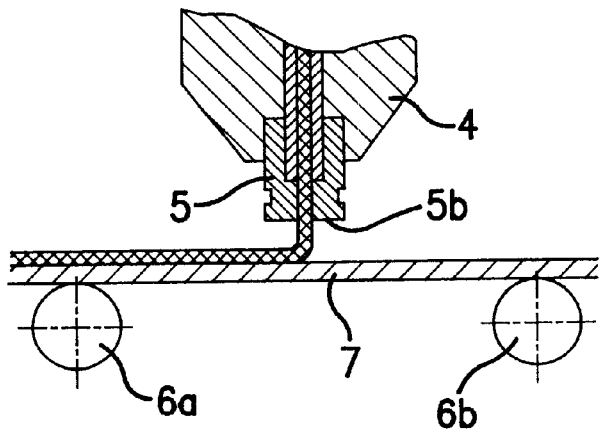
FIG. 10 This shows the application of the Multi-tube extruding equipment for curtain-coating purpose.
Figure 11:
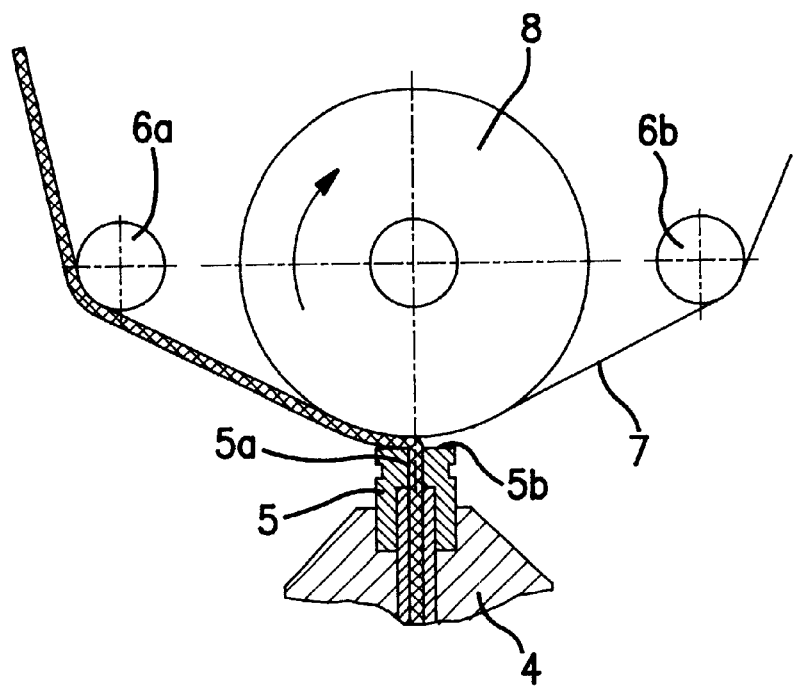
FIG. 11 This shows one type of coating.
Figure 12:
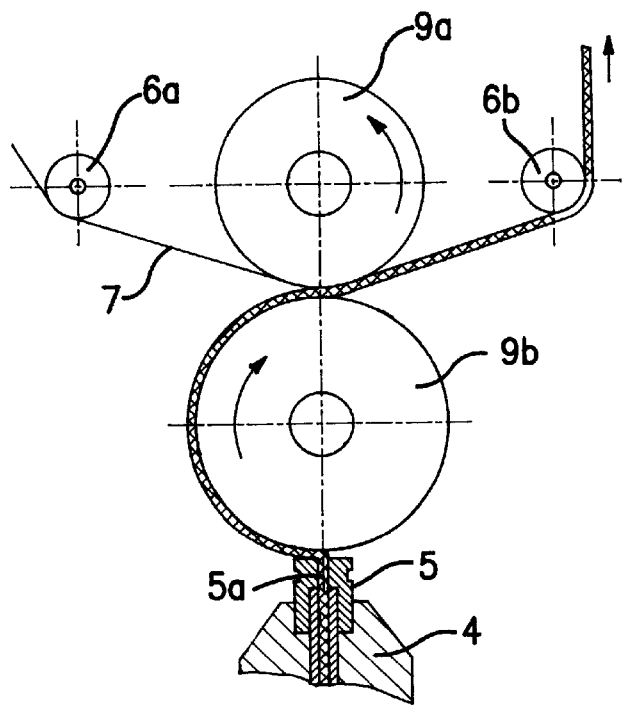
FIG. 12 This shows another type of coating.
Figure 13:
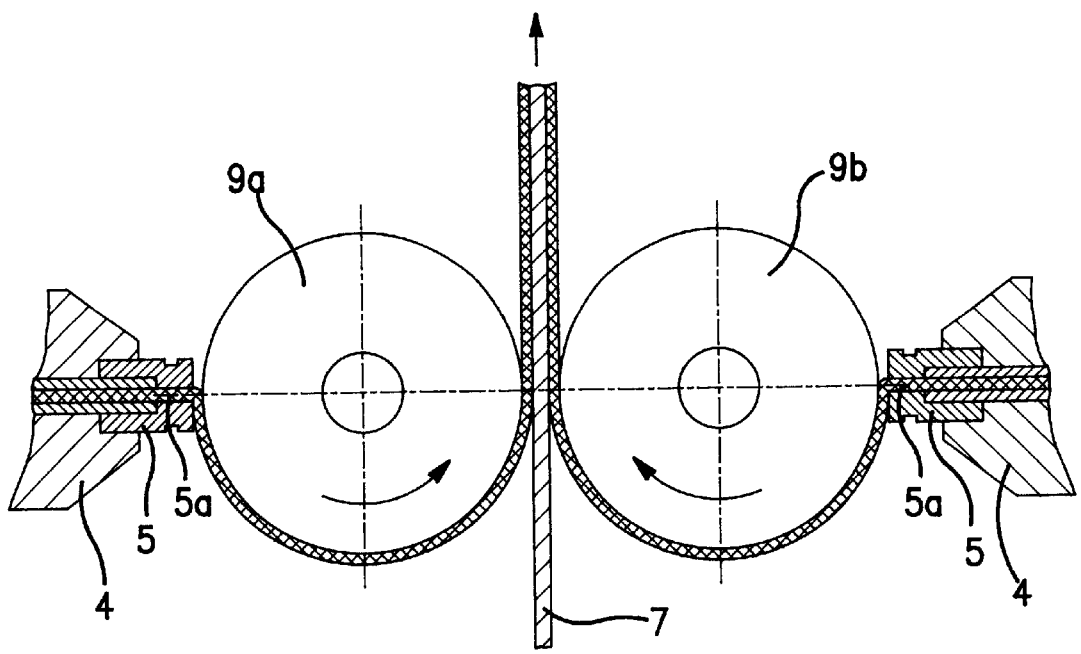
FIG. 13 This also shows another type of coating.
Figure 14A:
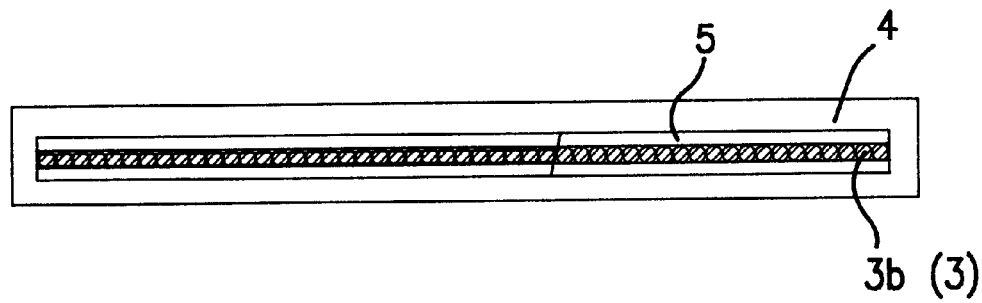
FIG. 14 This shows how the Multi-tube extruding equipment called as "Coating die lips with variable valves" works.
Figure 14B:
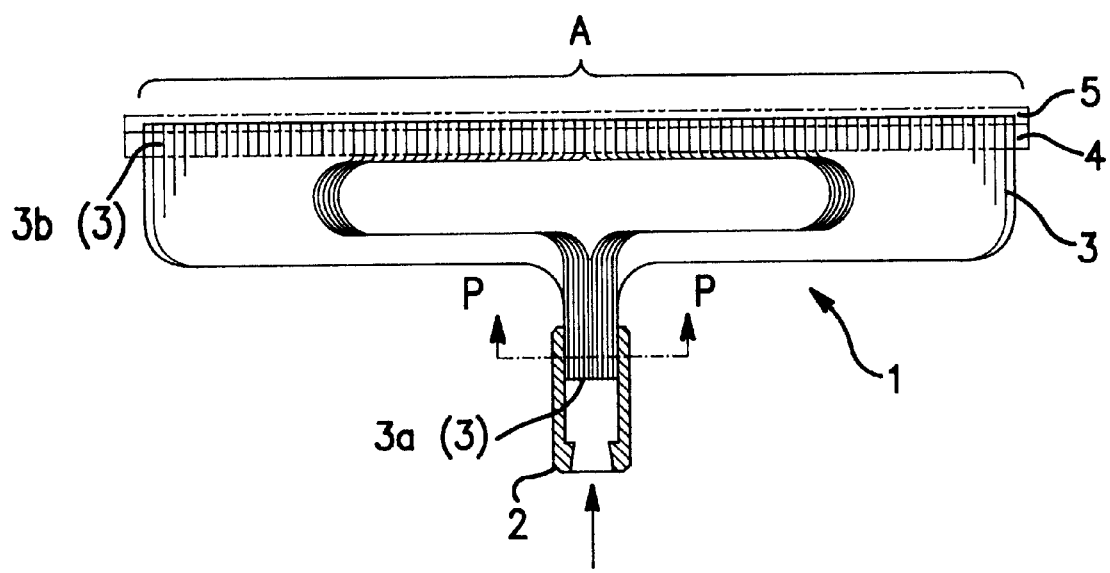
Figure 15A:
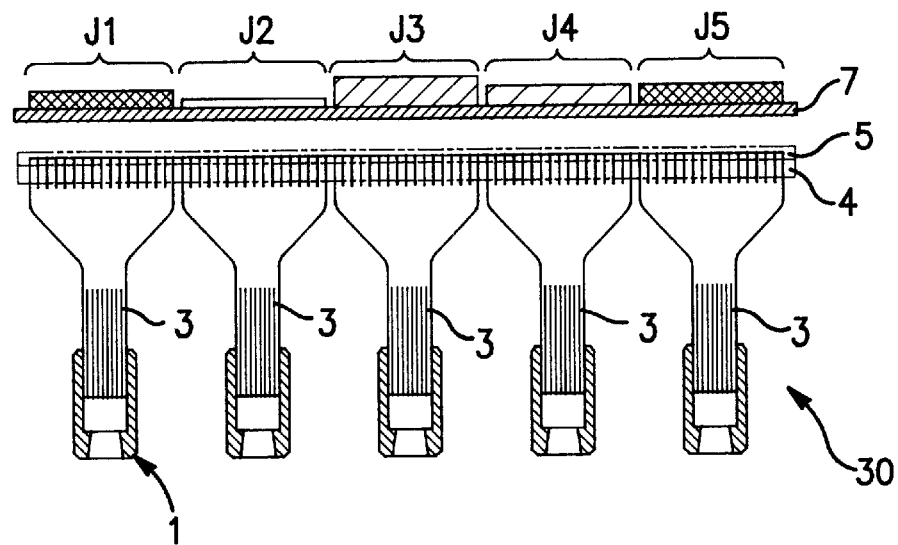
FIG. 15 This illustrates the Multi-tube extruding equipment having several units of that of Drawing 1 or Drawing 6.
Figure 15B:
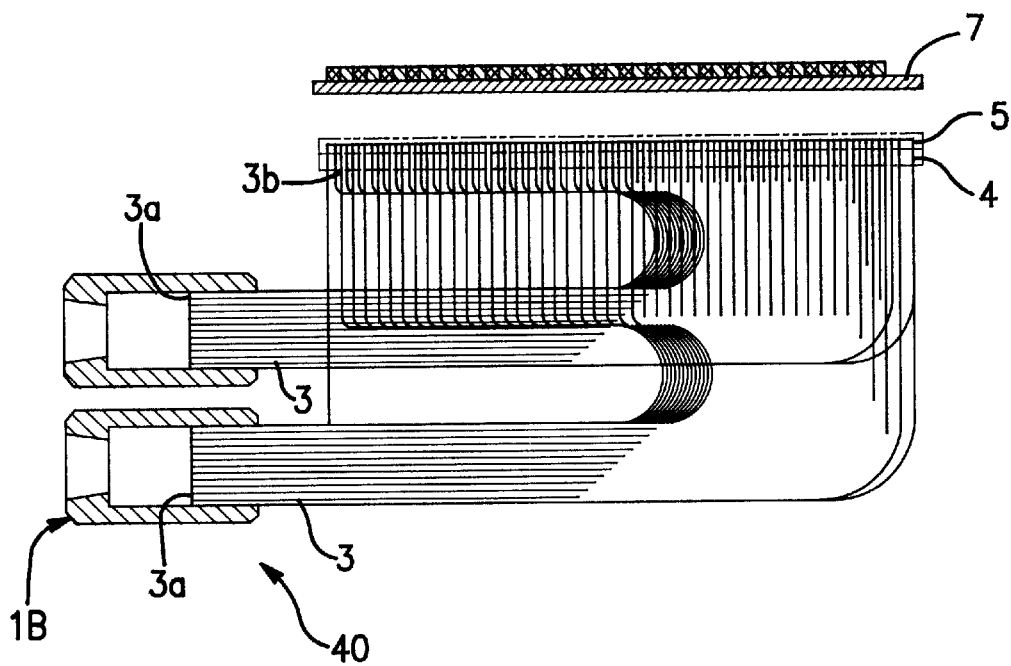
Figure 16A:
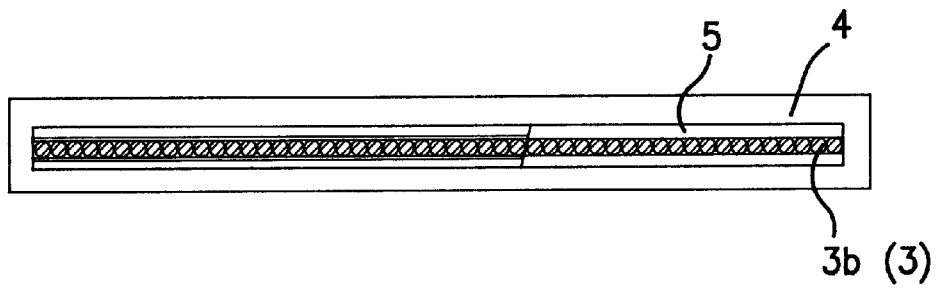
FIG. 16 This shows a Manifold fluid extrusion equipment having the extrusion die lips claimed under this application.
Figure 16B:
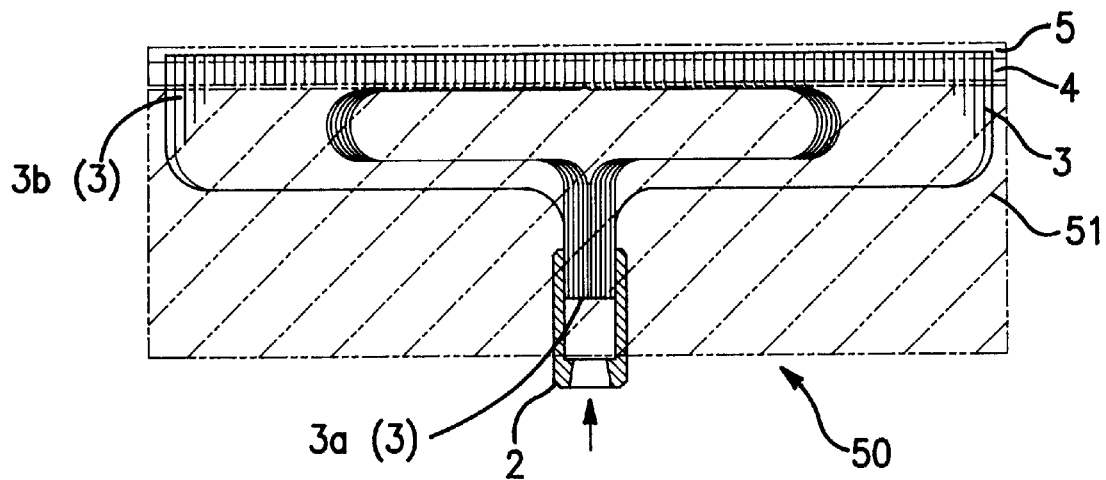
Figure 17A:
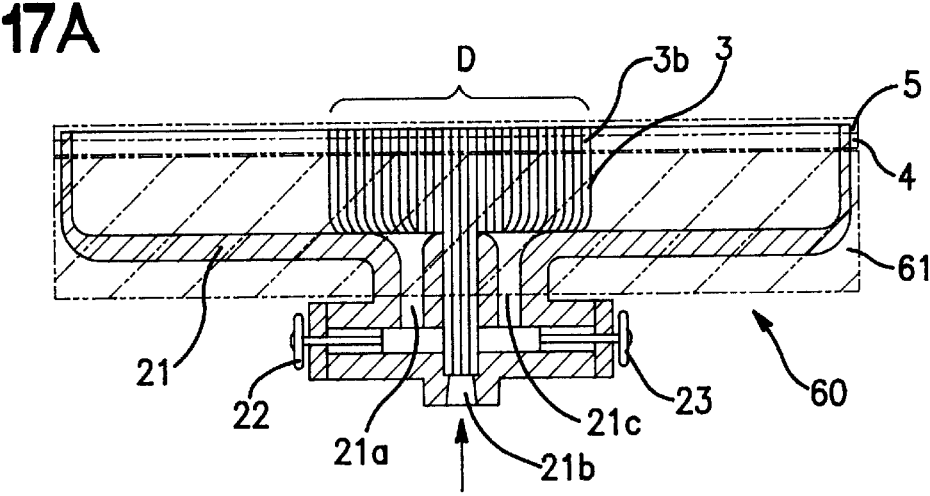
FIG. 17 This shows a Multi-tube extruding equipment having the coating die lips with variable valves.
Figure 17B:
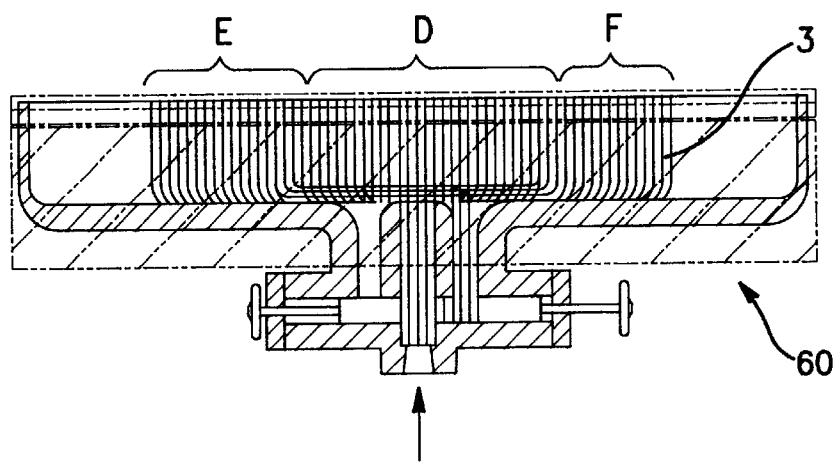
Figure 17C:
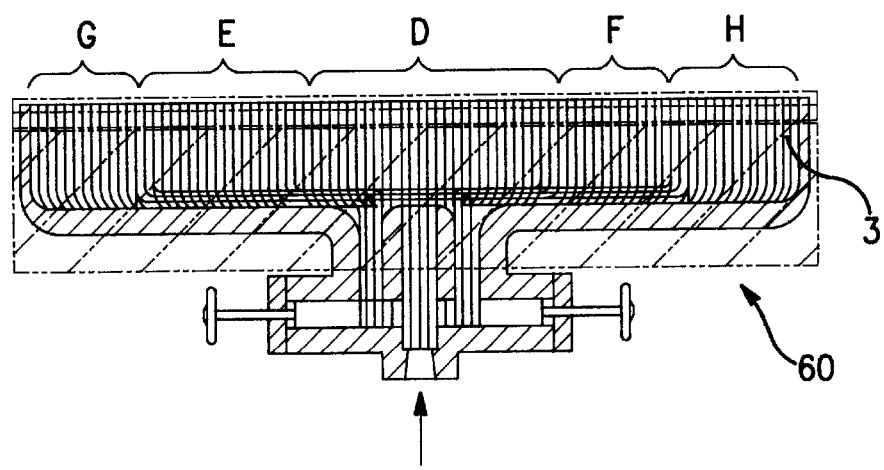
Figure 18A:
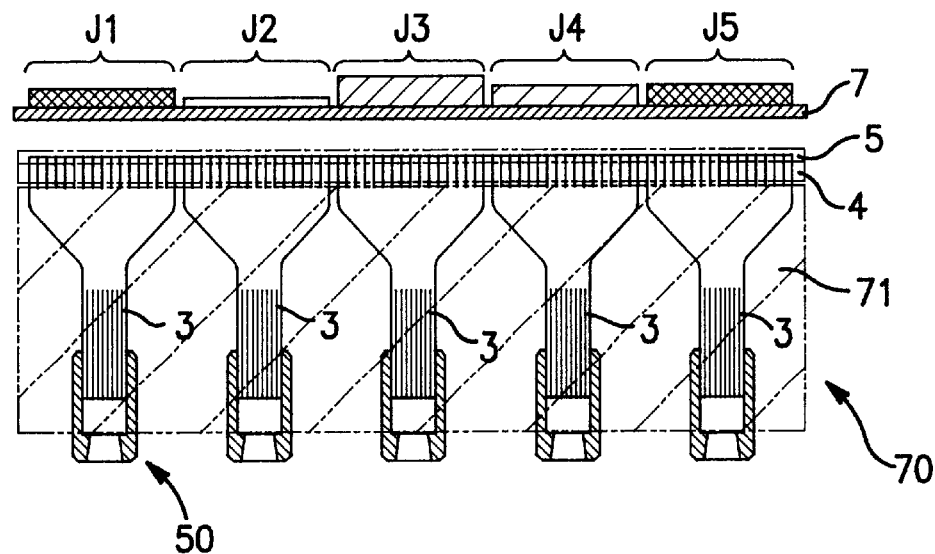
FIG. 18 This shows a Multi-tube extruding equipment consisting of several units of Drawing 16.
Figure 18B:
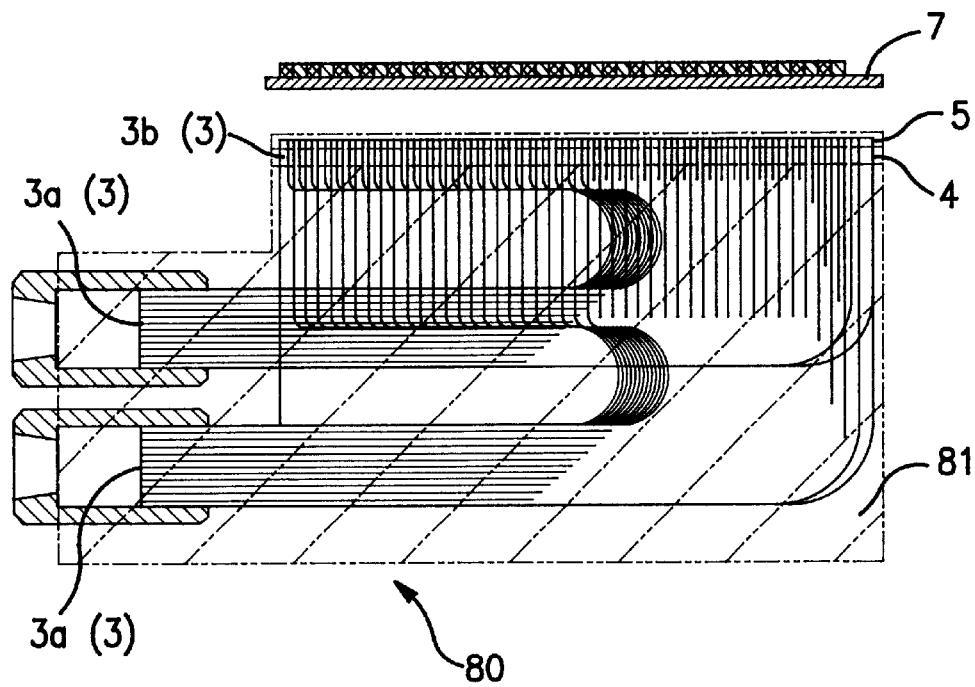
Figure 19:
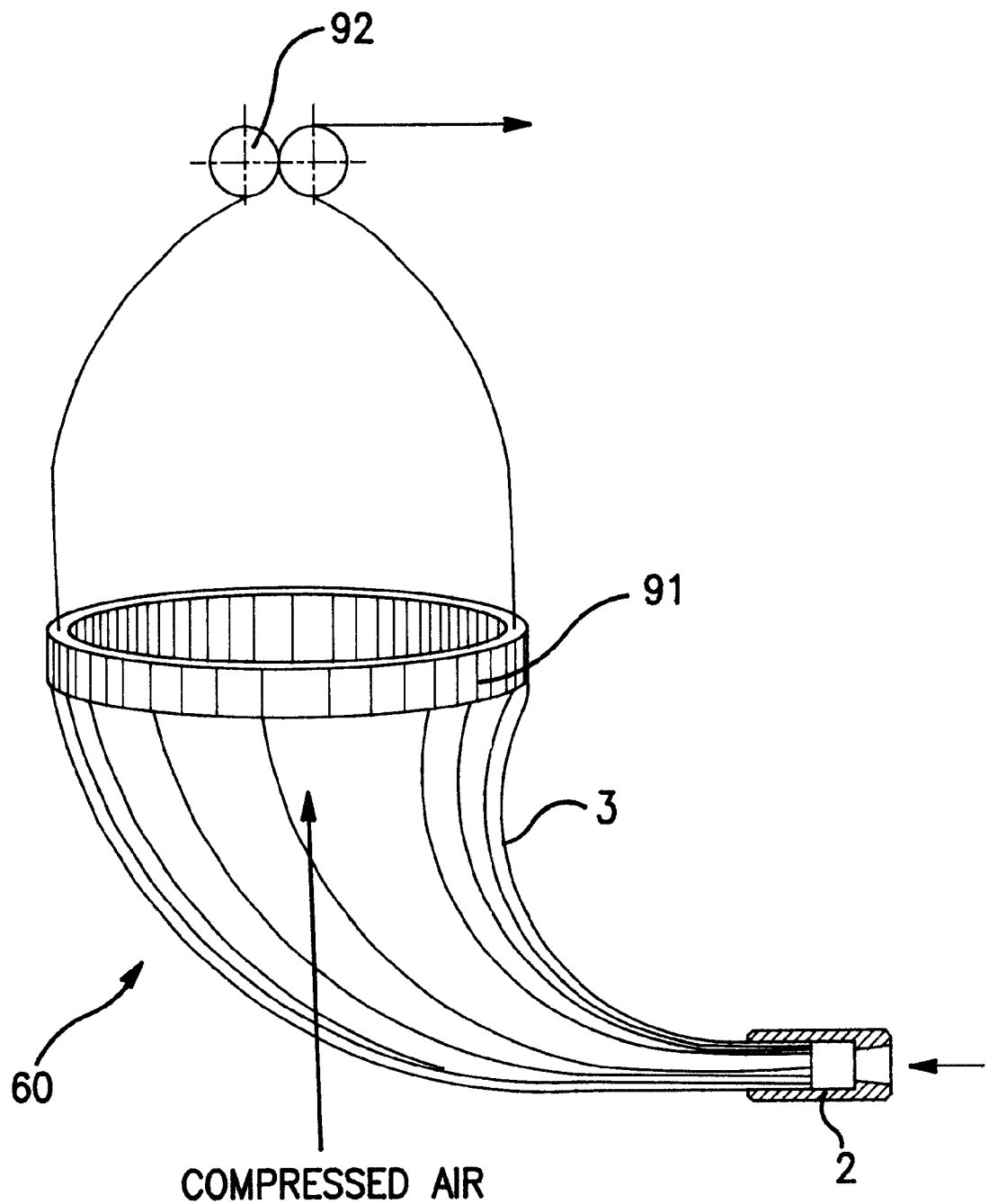
FIG. 19 This illustrates a forming equipment by inflation technology.
Figure 20B:
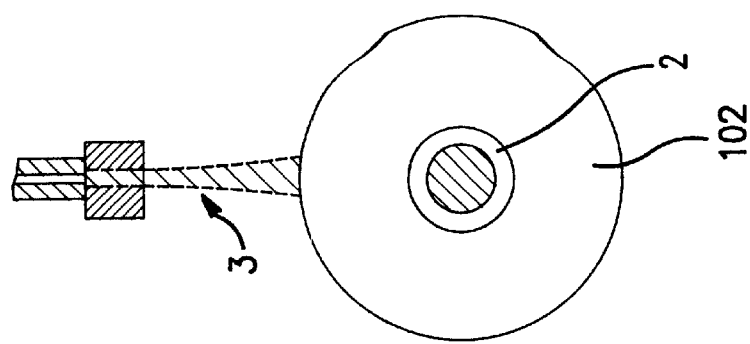
FIG. 20 This shows a Multi-tube extruding equipment with an electromagnetic induction heater.
Figure 20A:
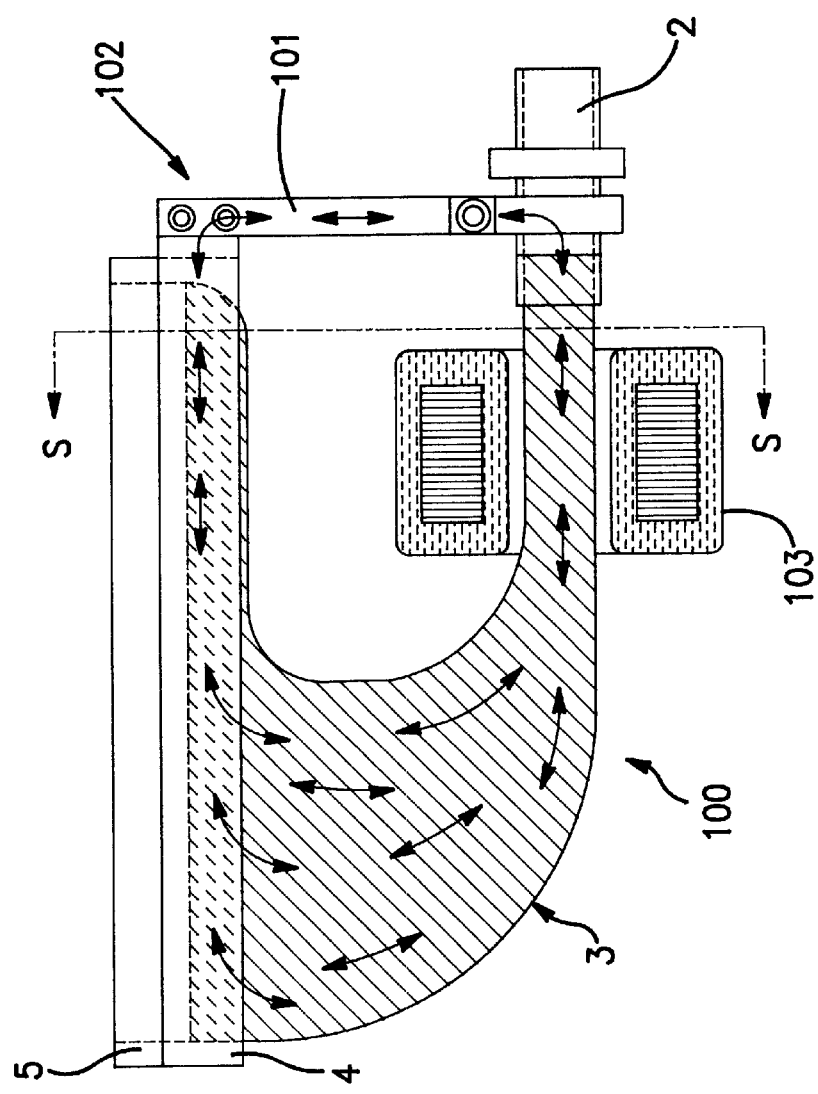
Figure 21A:
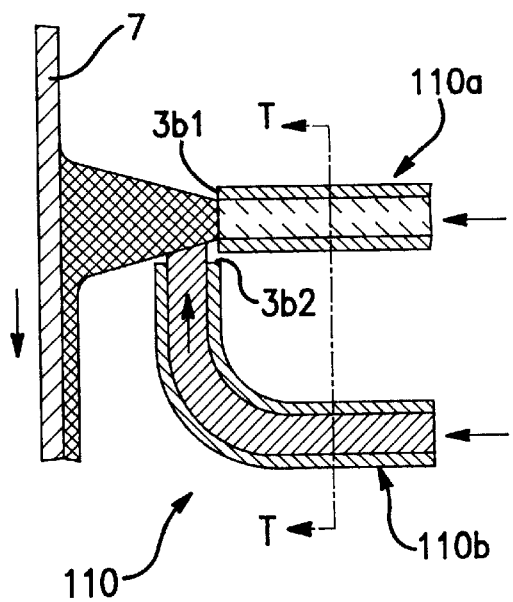
FIG. 21 This shows an application of the Multi-tube extruding equipment as a spray coater.
Figure 21B:
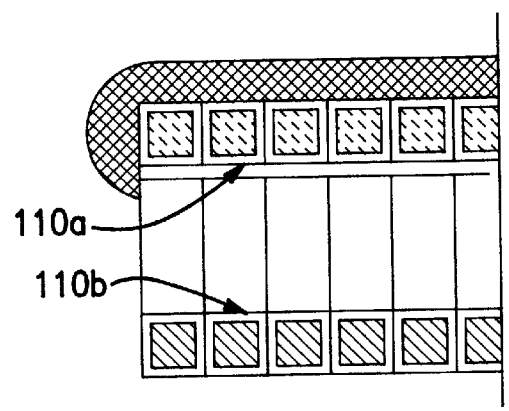
Figure 22:
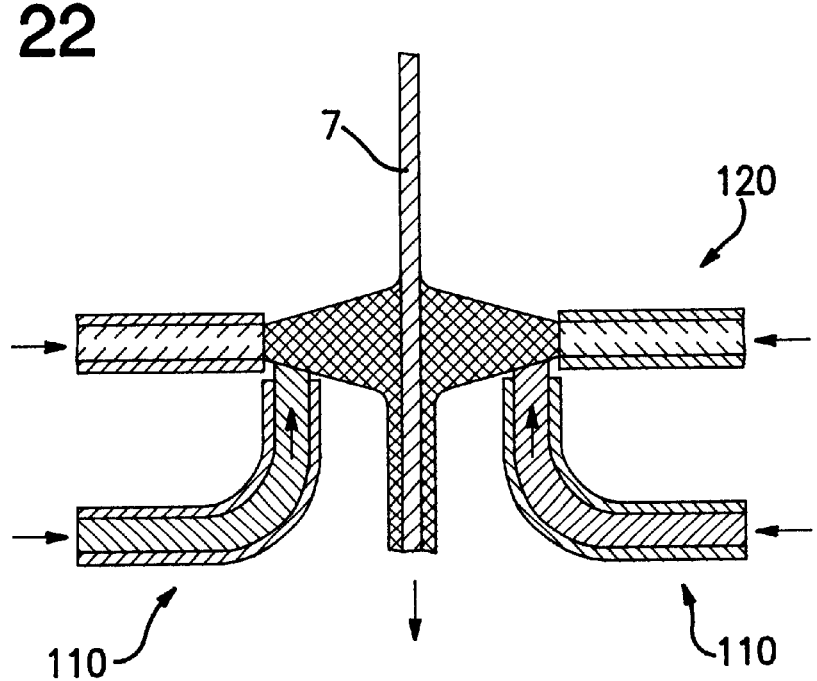
FIG. 22 This illustrates a manifold fluid extrusion equipment used as a double-faced spray coater.
Figure 23:
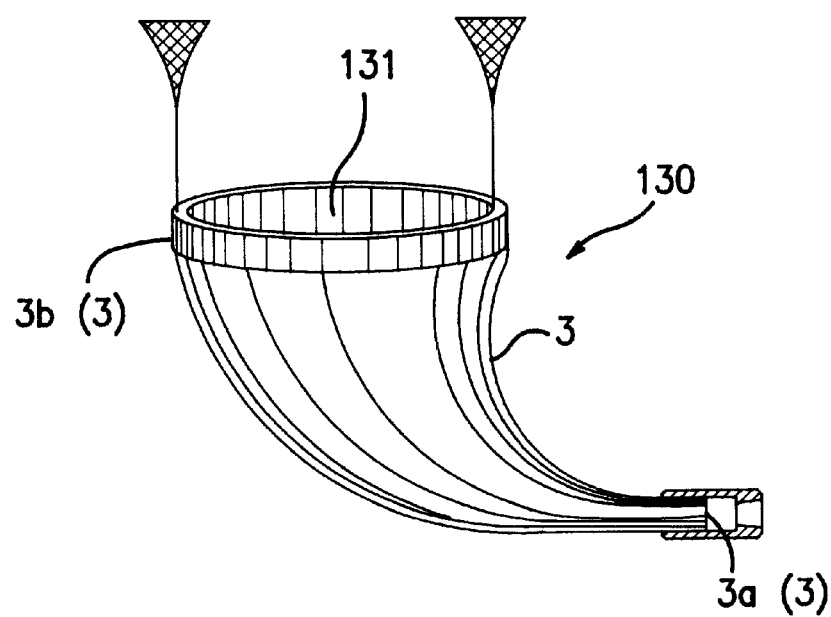
FIG. 23 This illustrates a Multi-tube extruding equipment used as a circle spray coater.

The detailed description of the preferred embodiment of this invention "Multi-tube extruding equipment" is hereinafter given together with drawings of reference.

Firstly, the Multi-tube extruding equipment for use as the coating die of fluid coating materials is explained. Drawing 1 shows the construction of this equipment. This equipment 1 comprises the following components:

Joint 2 which connects this equipment and the materials supply equipment by hoses etc. (not shown)

Many round or square tubes 3 of which one ends 3a for connection to the Joint's inlet of the fluid coating material are bunched and inserted into the Joint[Refer to Drawing 2(A) or (B)] and the other ends 3b, the outlet of materials, are lined up in parallel and in a single plane of a width A in the cross machine direction and securely fastened to the die lips 5

Holder 4 of the die lips

Slit 5a inside of the die lips 5 which converts the fluid coating material flown out from 3b of the tubes into a film of a pre-determined thickness and extrudes out [Refer to Drawing 3(A)].

The fluid coating material, for example, as shown in Drawing 3(B), which flows out from the outlet 3b of each round tube 3 is joined, converted into a fluid film of a pre-determined thickness at the slit 5a, and then continuously extruded for coating on the base web 7 which is sent via guide rolls 6a & 6b. The coating side of the base web 7 is pushed by the surface 5b of the die lips 5. The Drawing 1(A) shows the plane view of this equipment 1 and Drawing 1(B) shows the front view of this equipment 1. The Drawings 2(A) and (B) show the section views at P—P of Drawing 1(B). The Drawing 3(B) represents the section view of Q—Q of the same drawing (A).

The unique features of this equipment enables such a special arrangement as per 1A of Drawing 4 to have two separate groups of tubes 3 with a certain distance between the two groups. Here, each group has a certain number of tubes 3 of which the other ends are laid in parallel in a plane to cover a certain width B or C respectively. If the B and C are placed each other at the opposite side of the base web, it is possible to do a simultaneous coating on both sides of the web. It is also possible to arrange this equipment as shown in Drawing 5 where the entering flow of the material into the tube and outgoing flow from the tube, in other words the ends 3a of tubes 3 located at the material inlet side and the other ends 3b of tubes 3 located at the material discharge side make right angles to each other. This specially arranged equipment 1B of a right-angled layout is also applicable to such an application as shown hereinafter in the Drawing 15(B) for extruding the fluid coating material.

The Drawing 6 shows the equipment 10 having die lips 11 in stead of the die lips 5 of the equipment 1. In between the outlet of the tubes and the entrance to the slit 11a inside of the die lips 11, a rectifier 12 of lattice type or screen type or porous type is installed for the purpose of increasing the extruding pressure uniformly in the cross machine direction making the slit 11a bigger for easier fabrication and for handling of materials of higher viscosity (as mentioned hereinabove).

The illustration (B) in the Drawing 6 shows the section view at R—R of the same drawing.

With the equipment 1 &/or equipment 10, various kinds of coating can be done onto the above mentioned base web. A desired type of coating becomes possible by selecting the layout of the other ends 3b of the tubes of the equipment 1 or equipment 10 and selecting the number of the equipment 1 &/or 10 for the desired coating type and width. For example, such a coating of uneven profile of thickness with the same coating material as shown in the Drawing 7(A) or an alternate parallel layout of two different coating materials as shown in the Drawing 7(B) can be made.

Furthermore, such a stripe pattern coating by two different coating materials as shown in the Drawing 7(C) can also be made by placing a spacer in between each two neighboring tubes 3 of this equipment. The mark A or B in the Drawing 7(C) indicates each different coating material respectively.

A co-extrusion coating of the multi-layer fluid film can be made by using a single unit or plural units of the equipment 1 or 10 while such unstable flows between the layers and uneven profiles of thickness of each layer in the cross machine direction as often observed on the conventional equipment is not seen any more. With such arrangement of the other ends 3b of tubes laid in a plane and in parallel and stacked in two rows for a certain coating width as shown in the Drawing 8(A), it is possible to produce two layers of a common material or two layers each of which is made of a different material respectively, or also possible to extrude two different materials alternately, one material from one of the two neighboring tubes and the other material from the other tube of the two neighboring tubes. In the third possible application of the preceding sentence, the number of the different materials are not necessarily limited to two different materials only. The Drawing 8(B) shows an arrangement of the two stories tubes having the partition plate in between the two stories. This partition plate is able to avoid to cause 凸凹 on the contacting surface of the two layers.

Another application of this equipment is shown in the Drawing 9. Here, the other ends 3b of the tubes are simply held by the Holder 4 and no such die lips as 5 or 11 are furnished. The melted coating material is extruded direct from the other ends 3b of the tubes. The Drawing 9(A) shows a layout of square tubes in two (2) rows and the drawing 9(B) shows a layout of round tubes in three (3) rows by horizontally shifting the tubes of the middle row by a distance equal to the radius of the tube.

Described hereinafter are various types of coating on the base web 7 by this equipment 1 (this is also applicable to the equipment 10).

The first type shown in the Drawing 10 is so-called "curtain coating" where the fluid coating material is flown by the gravity onto the surface of the base web 7 which is sent by the guide rolls 6a and 6b. In this type of coating, it is possible to have a certain clearance between the opening surface 5b of the die lips 5 and the base web 7.

The Drawing 11 shows a modification of the arrangement described in the Drawing 3 hereinabove. The coating material extruded out from the outlet of the slit 5a is coated onto the base web 7 which is transferred by the guide rolls 6a and 6b through the clearance between the upper back-up roll 8 and the opening surface 5b of the die lips 5. The back-up roll 8 placed on the other side of the coating surface of the base web 7 gives a pressure to the above mentioned opening surface 5b.

The Drawing 12 shows an off-set coating in which the base web does not make a direct contact with the opening of the die lips. The coating material coming out of the outlet of the slit 5a is once coated on the surface of the roll 9b and then transferred to the surface of the base web 7 which is sent through the nip of two rolls 9a and 9b.

The Drawing 13 shows a double-faced coater. The two coating heads facing each other once transfer the coating material extruded from the outlet of the slit 5a to each surface of the coating rolls 9a and 9b respectively which carry the coating material to the nip point of the two rolls and then coat both surfaces of the base web passing through the nip by transferring the coating material from the roll surface to the web surface.

Drawing 14 shows a Multi-tube extruding equipment 20 with variable valves which enables to get desired coating widths as described in (A)~(C) there. Hereinafter,this equipment 20 is described in comparison with the equipment 1. The same is applicable in comparison with equipment 10, too.

What is different from the equipment 1 is that the equipment 20 has such a Joint 21 in stead of the Joint 2. In the Joint 21, for example, there are three passages 21a, 21b and 21c to which each of any 3 divisions of the other ends 3a of a bunch of the tubes 3 is connected respectively, and there are two changeover valves 22 and 23 for the two passages 21a and 21c(the valve 22 for the passage 21a and the other valve 23 for the other passage 21c). The other ends 3b of the tubes are laid on the front edge of the Joint 21 in a row in the cross machine direction[The drawings (A)~(C) show only the tubes 3 in which the coating material is currently flowing.].

Explained hereinafter is the operation of the equipment under conditions of (A)~(C) for making the extruded film.

On the equipment under the condition (A), the passages 21a and 21c are closed by the valves 22 and 23 while the passage 21b is open. As the result, an extruded film having the width D is produced. On the equipment under the condition (B), the passage 21a is closed by the valve 22 while the passages 21b and 21c are open. As the result, two more extruded films, one film of width E and the other film of width F, in addition to the extruded film of width D are produced at the same time to make a film web having the combined width of (D+E+F).

On the equipment under the condition (C), all of the passages 21a,21b, and 21c are open and such an extruded coating film web having of the combined width of (D+E+F+G+H) is produced. An extruded film consisting of any one or any combination of the widths D,E,F,G,H can be easily produced by this equipment 20 by simply changing the positions of the changeover valves. Without saying, it is also possible to change the amount extruded from the passages 21a and 21c by adjusting the opening of the changeover valves 22 and 23 on this equipment 20. It is also easy to get a coating film having the maximum width available or a smaller width on this equipment 20. It is also obviously possible to produce two film webs of width E and F only or a film web having the width of (E+D+F+H) under the conditions (B) or (C) by installing another changeover valve at the passage 21b.

An unique extruding equipment 30, for example, consisting of five (5) units of either equipment 1 or equipment 10 as shown in the Drawing 15(A) is also available. On this equipment 30, five film webs of same grade or different grades are extruded horizontally in a row from each of five (5) units of the equipment 1 or 10.

As shown in the Drawing (A), five (5) film webs of same grade and caliper or of same grade but different calipers or of different grades but same caliper (coating material in a stripe pattern) can be extruded from the five (5) individual units of equipment 1 or 10 making up the whole equipment 30. [In the drawing (A) five different film webs each having widthes J1 to J5 respectively and made of different material and having different caliper respectively are illustrated.] It is, of course, possible to mount on each unit such tubes which are different in the shape, especially in the section shape, from those of the other four units. An automatic control system of the valves may be installed for control of the flow and extrusion amount for making film webs. This special extruding equipment 40 of the drawing (B) for production of a film web having the profile made of alternately different material in the cross machine direction, is so designed that the one ends 3a of the tubes 3 arranged in a plane and mounted into the two units of above-mentioned Joint 1B where the coating material flows into the tubes and the other end 3b at the outlet side of the tubes 3 arranged also in a plane and mounted into the extrusion die lips would make right ankles each other. In addition to this right-angled arrangement, the other ends 3b of the tubes coming from one unit of Joint 1B and the other tubes coming from the other unit of Joint 1B are alternately piped to the coating die lips one by one. In the drawing (B), a section view of the coated layer made of two different materials of which two neighbouring stripes are alternately different each other across the machine direction, is illustrated.

The description of this Multi-tube extruding equipment for use as the extruder of melted plastic materials is given hereunder:

The basic design of the extruding equipment 50 is identical to that of the equipment 1 or 10. The different feature of this equipment 50 is the heater 51 which surrounds the tubes 3 for heating of the fluid inside the tubes as shown in the Drawing 16. The melted plastic material is heated during its flow from the inlet at the bundled ends 3a to the outlet at the other ends 3b and then extruded into a film having a pre-determined width and thickness. (No explanation about further processing of the extruded film in the down stream is given here because such further processing remains same as the conventional one.) The above mentioned heater could be electromagnetic induction heaters or electric heaters or hot water heaters. The Drawing 16(A) shows the plane view of the equipment 50 and drawing 16(B) shows the front view of the same equipment. It is also possible to construct an united Multi-tube extruding equipment by combining plural units of this equipment 50 in the same way as that for the equipment 1 or 10. Such a special arrangement of grouping the other ends 3b of the tubes 3 into two widthes B & C which are installed in parallel, in the same plane and apart by a certain distance each other as shown in the Drawing 4 is also possible with this equipment 50 for production of plastic films. For example, it is also possible to do the double-faced film coating on both surfaces of the base web by installing the two units B & C in such a way that they face each other at both sides of the base web. Another arrangement to have the tubes of which inflow direction and outflow direction of the material make a right angle installed can also produce plastic films. In this arrangement the plane of installation of the one ends 3a of the tubes 3 at the material inlet side and the plane of installation of the other ends 3b of the tubes at the material outlet side make a right angle.

It should be also noted that a so-called multi-ply plastic film coating can be done by plural units of the equipment 50 without causing unstable flows among the layers and uneven caliper profile across the machine direction. In other words, when producing a film of two layers on such an extruding equipment as shown in the Drawing 8(A) where the other ends 3b of the tubes laid out in parallel and in a plane to make a certain width are stacked into two rows, a film web of two same grade layers or of two different grade layers can be produced, and a film of two layers of which each layer is made of stripes of two different materials in the cross machine direction (each of the two neighbouring stripes being alternately made of a different material respectively) can also be produced.

Another arrangement of the equipment is the extruding equipment 60 which is to be used as an extruding die with the changeover valves, similar to the coating die lips with the changeover valves shown in the Drawing 14. This equipment 60 has the same basic arrangement as that of Drawing 17 and what is different from the equipment 20 is the heating chamber 61, similar to the above-mentioned heating equipment 51, which covers the Joint 21 partially and heats the melted plastic material inside the tubes. As for the components of this equipment 60, no explanation is given here, but the same marks are written there in the Drawing 17 as far as they are same components as those of the equipment 20 shown in the Drawing 14. This equipment 60 is capable to extrude a film of width D in case of the Drawing (A), a film made of widthes E and F in addition to D in case of the Drawing (B) and a film made of widthes G and H in addition to D,E,F. These drawings show how to extrude a film of a certain width on this equipment 60.

As explained in the Drawing 15(A), the other extruding equipment 70 can be constructed by uniting several units of the above-mentioned equipment 50. The outline of this equipment 70 is as per the Drawing 18(A). The different specification of this equipment 70 compared with the equipment 30 is its heating chamber 71 which covers the tubes 3 and heats the melted plastic material inside the tubes.

As for the same components of this equipment 70 as those of the equipment 30, the same marks as those in the Drawing 15(A) are written in the Drawing 18(A) but no explanation is given here. This equipment 70 is capable to extrude several plastic film webs of such different widthes as J1~J5, of same grade and shape, especially the thickness, of same grade but different calipers, or of different grades but same caliper (coating material extruded in a stripe pattern). In this arrangement, it is also possible to have tubes of different shapes, especially the section shape, or to adjust the amount of the material for extrusion of film by installing control valves, for each unit of the equipment 50 respectively.

Another possibility is to make an extruding equipment 80 by arranging the installation of one ends 3a of the tubes 3 and the other ends 3b on the outlet side at right angles each other. The outline of this equipment 80 is as per the Drawing 18(B). The different point of this equipment 80 compared with the equipment 40 is its heating chamber 81 covering the tubes 3 to heat the plastic material inside the tubes. As for the same components of this equipment 80 as those of the equipment 40, the same marks as those in the Drawing 15(B) are written again in the Drawing 18(B) but no explanation is given here. Shown in the Drawing (B) is a section view of the extruded and coated film layer made of two different materials stripes laid out alternately across the machine direction.

This extruding equipment of this invention can be used as a so-called "inflation forming equipment". The outline of this equipment 90 is shown in the Drawing 19. In this equipment 90, the other ends 3b of the tubes 3 in parallel and in a plane are installed into the circle holder (not shown in the drawing) and the circle die lips 91 are mounted on the holder. In this equipment there are also a pair of nip rolls 92 at a location apart by a certain distance from the die lips. This nip rolls are to pull out the inflated plastic bags from the die lips of this equipment 90.

The film tubing extruded from the die lips 91 is sent by the compressed air (compressed fluid) blown out to the same direction of the film into the inflated film tubing and later taken out by the pair of nip rolls 92 as the finished bags while the tubes 3 are heated by the heater (not shown in the drawing).The application of this equipment 91 will be in the area of packaging machines of foodstuffs etc.

As the method of heating tubes 3, one solution is to place them into a heating chamber and heat the plastic material inside the tubes in a similar way to that of the equipment 50. However, the electromagnetic induction heater is recommended for this purpose because of its quicker response and better control of the heat. The Drawing 20 is to explain the extrusion equipment 100 with the electromagnetic induction heater. On this equipment 100, the Joint 2, tubes 3 (covered by oblique lines on the Drawing 20), and the Holder 4 are made of electric conductive metals, and the one ends 3a of the tubes 3 at the inlet side of the material are installed at right angles to the other ends 3b at the outlet side. The loop coil (secondary coil) 102 is formed on this equipment 100 by connecting the Joint 2, tubes 3, Holder 4 and the electric conductive connecting bar 101 (connecting the Joint 2 and the Holder 4). The connecting bar 101 is a bigger one than the normal and the other ends 3b of the tubes 3 are soldered to the Holder 4 for a better conductivity. As shown in the Drawing 20, the loop iron core 103 with the primary coil is mounted at the location right after the Joint 2 where the tubes 3 are put together closely in such a way to make one chain connection to the loop 102. When an alternate current voltage is applied to the primary coil, a primary electric current is generated in the coil and the magnetic flux is generated in the loop iron core 103. Then some voltage and induced electric current are generated in the loop 102. The induced electric current produces some Joule's heat in the tubes 3 which heats the fluid material inside the tubes.

The advantage of this electromagnetic induction heater is an easy adjustment of the temperature of the fluid material by simply changing the electric current and also easy control of the fluid temperature to the required level based on the fed back information. The response in this heater is much faster than the other methods. The arrows shown in the Drawing 20 indicate the secondary alternate electric current, and the Drawing 20(B) is the section view at S—S line of the Drawing 20(A).

The Multi-tube extruding equipment of this invention can be used as a wide spray coating equipment on top of the above mentioned coating die lips and plastic extruder. Shown in the Drawing 21 is the outline of this spray coating equipment 110. This equipment 110 is one of the above mentioned extruding equipment. This equipment 110 consists of two units (the equipment 110a and 110b) each of that has one set of the other ends 3b laid and tightly held in a plane, in parallel and in one row, and is so arranged that the compressed air (compressed fluid) extruded from the other ends 3b1 of one unit and the coating color (powder fluid) extruded from the other ends 3b2 of the other unit meet each other at a right angle. The coating color extruded from the other ends 3b2 is sprayed together with the jet stream of the compressed air ejected from the other ends 3b1 on the surface of a stationary or travelling base material. The Drawing (B) is the section view at T—T line of the Drawing (A).

Another equipment 120 having two units of the equipment 110 as shown in the Drawing 22 can coat the both surfaces of the base material 7 as a double-faced spray coating equipment. This equipment 120 has versatile ways of operation because of the special feature of the multi-tubes. One way of its operation is to have the unit 110a for ejecting the compressed air and the unit 110b for extruding the coating color.

Both units of 110 and 120 can also be used as a dampening equipment or static electricity remover. For example, when the compressed air is ejected from the other ends 3b1 and water or dampening liquid is extruded from the other ends 3b2 of the equipment 110, dampening or static electricity elimination of the base material can be done.

Taking the advantageous features of the multi-tubes 3, such a circular spray coating equipment 130 as shown in the Drawing 23 is available. On this equipment 130, the other ends 3b of a group of tubes laid in a plane and in parallel are mounted along the circle of the Holder (not shown on the drawing) where the circular die lips 131 is fastened to so that the liquid extruded from the other ends 3b could be ejected through the die lips 131. (Some partial ejected streams are shown in the Drawing 23.) This equipment 130 could be used for making the air-curtain, air-knife, and air-distributor.

What is claimed is:

1. An apparatus for manufacturing an extrusion comprising:
    a supply of extrusion material;
    a means for introducing the extrusion material into a joint;
    the joint securing a plurality of tubes of substantially identical cross-section, the tubes being held in a bunch, each tube having a material inlet for receiving the extrusion material and a material outlet for ejecting the extrusion material in an extrusion direction;
    a holder securing the material outlets of the tubes in an output configuration wherein the material outlets are arranged in at least one substantially straight line longer than any diameter of said bunch.

2. An extruding equipment as claimed in claim 1, wherein all of the multi-tubes have an identical length.

3. An extruding equipment as claimed in claim 1, including die lips having the outlet ends of the multi-tubes inserted therein, the die lips having a slit therein where the material flown out from the tubes is formed into a film.

4. An extruding equipment as claimed in claim 3, including a rectifying device built in inside the slit.

5. An extrusion assembly comprising a joint for receiving an extrusion material, a plurality of tubes of substantially identical cross-section, and a holder, wherein:
    the joint has a first end and a second end,
        the first end being configured to be attached to an extrusion material source for receiving the extrusion material and for directing the extrusion material to the second end, and
        the second end being configured to hold the plurality of tubes and to direct the extrusion material into the tubes;
    the tubes each have a length, an inlet end and an outlet end,
        the inlet ends of the tubes being arranged in a bunch and held securely within the second end of the joint for receiving a flow of the extrusion material and
        the outlet ends of the tubes being arranged in an outlet configuration and held securely within the holder for extruding the flow of extrusion material in an extrusion direction; and
    the holder being arranged and configured to hold the outlet ends of the tubes in at least one substantially straight line longer than any diameter of said bunch.

6. An extrusion assembly according to claim 5, wherein the inlet configuration and the outlet configuration are substantially identical.

7. An extrusion assembly according to claim 5,
    wherein the outlet configuration holds the outlet end of each tube within a predetermined separation distance of the outlet end of at least one adjacent tube,
    the separation distance being sufficiently small to allow the extrusion material flowing from the outlet end of each tube to contact the extrusion material flowing from each adjacent tube and combine to form a single extrusion body.

8. An extrusion assembly according to claim 7, wherein the outlet ends of the plurality of tubes are arranged adjacent one another in a single substantially linear row.

9. An extrusion assembly according to claim 5, wherein the outlet ends of the tubes are arranged in a first row and a second row, wherein the first row and the second rows are spaced apart and are bisected by a plane extending in the extrusion direction.

10. An extrusion assembly according to claim 5, wherein the each of the tubes has a substantially identical length.

11. An extrusion assembly comprising a joint for receiving an extrusion material, a plurality of tubes of substantially identical cross-section, and a holder, wherein;
    the joint has a first end and a second end,
        the first end being configured to be attached to a first extrusion material source for receiving a first extrusion material and directing the first extrusion material to the second end and
        configured to be attached to a second extrusion material source for receiving a second extrusion material and directing the second extrusion material to the second end and
        the second end being configured to hold the plurality of tubes and to direct the first extrusion material into a first set of tubes and to direct the second extrusion material into a second set of tubes;
    each of the first set of tubes and the second set of tubes having a length, an inlet end and an outlet end,
        the inlet ends of the first set of tubes being arranged in a bundled inlet configuration and held securely within the second end of the joint for receiving a flow of the first extrusion material,
        the inlet ends of the second set of tubes being arranged in a bundled inlet configuration and held securely within the second end of the joint for receiving a flow of the second extrusion material,
        the outlet ends of the first set of tubes being arranged in a first outlet configuration and held securely within the holder for extruding the flow of the first extrusion material in an extrusion direction,
        the outlet ends of the second set of tubes being arranged in a second outlet configuration and held securely within the holder for extruding the flow of the second extrusion material in the extrusion direction; and
    the holder being arranged and configured to hold the outlet ends of the first set of tubes and the second set of tubes in a substantially planar configuration perpendicular to the extrusion direction.

12. An extrusion assembly according to claim 11, wherein the outlet ends of the tubes are arranged adjacent one another in a single substantially linear row, the outlet ends of the first set of tubes and the outlet ends of the second set of tubes being arranged in a repeating sequence.

13. An extrusion assembly according to claim 12, wherein the repeating sequence alternates the output ends of tubes from the first set of tubes and the second set of tubes in a 1:2:1:2 fashion.

14. An extrusion assembly according to claim 11, wherein the outlet ends of the first set of tubes are arranged adjacent one another in a first substantially linear row;
    the outlet ends of the second set of tubes are arranged adjacent one another in a second substantially linear row; and
    the first substantially linear row and the second substantially linear row are arranged in a stacked and substantially parallel configuration.

* * * * *